J. Nicols,
Winnower.
No. 8,898 - X
Patented Jan. 15. 1835.
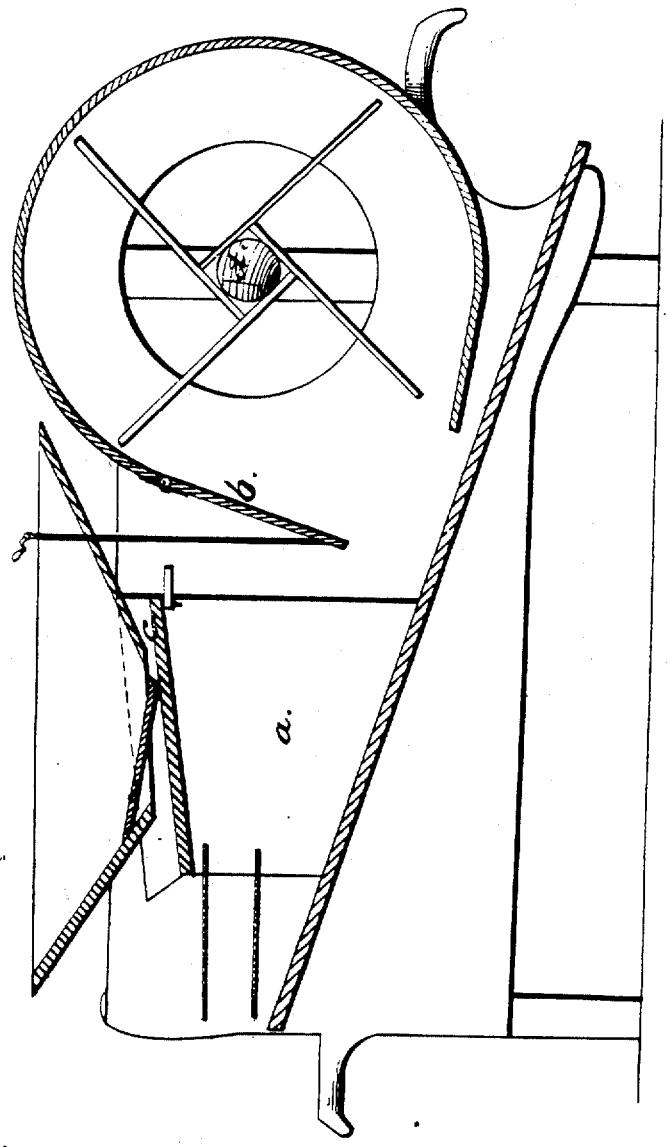
A. PETERS, PHOTO-LITHOGRAPHER, WASHINGTON, D. C.

6/15/1835 Ar. 15
June 15, 1835
8898X 453

Jeremiah Nicols of Kent County Maryland

Letters Patent.

The schedule referred to in these Letters Patent and making part of the same containing a description in the words of the said Jeremiah Nicols himself of his improvement in the machine for separating the chaff and straw from grain called "Nicols Winnowing Machine" —

Be it known that I Jeremiah Nicols, of the county of Kent Eastern shore of Maryland, have made an improvement in the useful arts, being an improvement in the machine for separating the chaff and straw from grain called "Nicols Winnowing Machine". This machine resembles in most particulars the improved machines now in use and the improvements therefore will only be described. The first improvement consists in attaching a piece of leather, or any other elastic substance on each side of the shoe, to prevent the escape of wind from the wings or revolving fans except through the shoe. The elasticity of the leather and the force of the wind keep it close to the sides of the machine & prevent its escape. The second improvement consists in a wind regulator attached to the end of the hoop above by hinges. This regulator is made of thin wood, and is raised or lowered by two straps, one on each side. The effect of it is to give direction to the wind, as well as to regulate its force. In the common winnowing machines a considerable portion of the wind escapes on each side and above the shoe which this improvement entirely prevents. Also in the common machine, the wind does not receive any particular direction, but is diffused generally. whereas by means of my improvement, it is directed in its proper course, and its force or velocity regulated by raising or lowering the regulator. The invention here claimed, and desired to be secured by Letters Patent, consists in the before described wind regulator, in the mode of preventing the escape of wind in any way except through the shoe by fixing leather or any other elastic substance to the sides of the shoe.

For a further illustration of my invention I refer to the model and drawing of the same deposited in the Patent Office.

Jeremiah Nicols

Witnesses
J. S. Roane
J. Alfred Elliot

E. L.
C. H. W.

420 [illegible]